(12) United States Patent
Jansen (10) Patent No.: US 7,874,310 B1
(45) Date of Patent: Jan. 25, 2011

(54) WATER COOLED LIQUID FUEL VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 176 days.

(21) Appl. No.: 12/421,385

(22) Filed: Apr. 9, 2009

Related U.S. Application Data (60) Division of application No. 10/937,711, filed on Sep. 9, 2004, now Pat. No. 7,527,068, which is a continuation-in-part of application No. 10/462,295, filed on Jun. 16, 2003, now Pat. No. 6,931,831.

(60) Provisional application No. 60/389,827, filed on Jun. 18, 2002, provisional application No. 60/501,250, filed on Sep. 9, 2003.

(51) Int. Cl.
*F02G 3/00* (2006.01)

(52) U.S. Cl. ..................... 137/340; 60/39.094

(58) Field of Classification Search ................. 137/240, 137/334, 340, 540, 625.48; 60/39.094, 740, 60/741; 165/154, 156; 239/106, 127
See application file for complete search history.

(56) References Cited

U.S. PATENT DOCUMENTS

| 698,474 A | 3/1902 | Ebbs |
|---|---|---|
| 856,538 A | 5/1910 | Mitchell |
| 1,013,867 A | 1/1912 | Denker |
| 2,505,613 A | 4/1950 | Farris |
| 2,770,945 A | 11/1956 | Crim |
| 3,038,487 A | 6/1962 | Gardner |
| 3,139,908 A | 7/1964 | Strader |
| 3,338,257 A | 8/1967 | Ferguson |
| 3,584,194 A | 6/1971 | Kautz et al. |
| 3,632,080 A | 1/1972 | King |
| 3,683,966 A | 8/1972 | Payne |
| 3,703,185 A | 11/1972 | Usry |
| 3,901,269 A | 8/1975 | Henderson |

(Continued)

OTHER PUBLICATIONS

Jansen's Aircraft Systems Controls, Inc., Engineering and Manufacturing of Fluid Control Components, pages from website at http://web.archive.org/web/20030711235731/jasc-controls.com/products.htm, dated 2003.

(Continued)

*Primary Examiner*—John Fox
(74) *Attorney, Agent, or Firm*—Quarles & Brady LLP (57) ABSTRACT

A water cooled valve is provided in the form of a check valve, an air purge valve, a distributor valve, a combination air purge and distributor valve and the like for use in the liquid fuel system of a gas turbine. A movable valve member controls the flow of fluid through the valve's fuel circuit. A separate cooling circuit circulates cooling water through the valve near or alongside the valve member. The water is of a lower temperature than the high temperature liquid fuel, and thereby carries away heat transferred to the valve by the fuel. In one form, the cooling circuit is formed in part by a helical groove in the periphery the valve body housing the valve member. A sealed water jacket surrounds the valve body and has dedicated supply and return ports for coupling the valve to a water supply via water lines. The water ports are positioned tangentially to induce swirling flow inside the valve.

20 Claims, 7 Drawing Sheets

U.S. PATENT DOCUMENTS

| | | | |
|---|---|---|---|
| 4,027,474 | A | 6/1977 | Demase |
| 4,041,695 | A | 8/1977 | Harper et al. |
| 4,095,418 | A | 6/1978 | Mansson et al. |
| 4,206,595 | A | 6/1980 | Cole |
| 4,222,405 | A | 9/1980 | Rosenblad |
| 4,327,772 | A | 5/1982 | Kawabata |
| 4,344,453 | A | 8/1982 | Tuchenhagen et al. |
| 4,359,929 | A | 11/1982 | Stearns |
| 4,375,873 | A | 3/1983 | Enomoto et al. |
| 4,467,957 | A | 8/1984 | Bucheit |
| 4,501,298 | A | 2/1985 | Inada et al. |
| 4,531,587 | A | 7/1985 | Fineberg |
| 4,583,570 | A | 4/1986 | Rabe |
| 4,633,939 | A | 1/1987 | Granetzke |
| 4,687,055 | A | 8/1987 | Leggett |
| 4,760,696 | A | 8/1988 | Rooks et al. |
| 5,014,738 | A | 5/1991 | Jones |
| 5,062,445 | A | 11/1991 | Junier |
| 5,103,777 | A | 4/1992 | Daikoku |
| 5,245,819 | A | 9/1993 | Kast |
| 5,346,175 | A | 9/1994 | Hunnicutt |
| 5,391,055 | A | 2/1995 | Carvalho |
| 5,448,890 | A | 9/1995 | Coughlan, III et al. |
| 5,762,099 | A | 6/1998 | Croucamp et al. |
| 5,809,771 | A | 9/1998 | Wernberg |
| 5,884,483 | A | 3/1999 | Munro |
| 6,050,081 | A | 4/2000 | Jansen et al. |
| 6,182,685 | B1 | 2/2001 | Goff et al. |
| 6,250,063 | B1 | 6/2001 | Davis, Jr. et al. |
| 6,253,573 | B1 | 7/2001 | Schwitters et al. |
| 6,385,962 | B2 | 5/2002 | Futa et al. |
| 6,412,271 | B1 | 7/2002 | Maker et al. |
| 6,427,717 | B1 | 8/2002 | Kimura |
| 6,438,963 | B1 | 8/2002 | Traver et al. |
| 6,442,925 | B1 | 9/2002 | Dalton et al. |
| 6,497,100 | B2 | 12/2002 | Blot-Carretero et al. |
| 6,609,380 | B2 | 8/2003 | Mick et al. |
| 6,675,583 | B2 | 1/2004 | Willis et al. |
| 6,729,135 | B1 | 5/2004 | Norris et al. |
| 6,807,801 | B2 | 10/2004 | McCarty |
| 6,918,255 | B2 | 7/2005 | Kaplan et al. |
| 6,931,831 | B2 | 8/2005 | Jansen |
| 7,044,155 | B2 | 5/2006 | Zanolin et al. |
| 7,117,675 | B2 | 10/2006 | Kaplan et al. |
| 7,527,068 | B2 | 5/2009 | Jansen |
| 2002/0084065 | A1 | 7/2002 | Isaac |
| 2005/0000578 | A1 | 1/2005 | Eberhardt et al. |

OTHER PUBLICATIONS

USPTO Non-Final Office Action, U.S. Appl. No. 10/937,711 (US Patent No. 7,527,068), dated Jun. 12, 2007.

Response to Jun. 12, 2007 USPTO Non-Final Office Action, U.S. Appl. No. 10/937,711 (US Patent No. 7,527,068), dated Sep. 12, 2007.

USPTO Final Office Action, U.S. Appl. No. 10/937,711 (US Patent No. 7,527,068), dated Nov. 9, 2007.

Response to Nov. 9, 2007 USPTO Final Office Action, U.S. Appl. No. 10/937,711 (US Patent No. 7,527,068), dated May 7, 2008.

USPTO Non-Final Office Action, U.S. Appl. No. 10/937,711 (US Patent No. 7,527,068), dated May 28, 2008.

Response to May 28, 2008 USPTO Non-Final Office Action, U.S. Appl. No. 10/937,711 (US Patent No. 7,527,068), dated Nov. 26, 2008.

WATER COOLED LIQUID FUEL VALVE

CROSS-REFERENCE TO RELATED APPLICATIONS

This application is a divisional of U.S. patent application Ser. No. 10/937,711, allowed on Feb. 24, 2009, filed Sep. 9, 2004, now U.S. Pat. No. 7,527,068 which claims benefit to U.S. Provisional Application No. 60/501,250 filed Sep. 9, 2003, and which is a continuation-in-part of U.S. patent application Ser. No. 10/462,295, filed Jun. 16, 2003, now U.S. Pat. No. 6,931,831, issued Aug. 23, 2005, which claims benefit to U.S. Provisional Application No. 60/389,827, filed Jun. 18, 2002.

STATEMENT OF FEDERALLY SPONSORED RESEARCH OR DEVELOPMENT

Not applicable.

BACKGROUND OF THE INVENTION

1. Technical Field

The present invention relates to fuel delivery systems for land and air based gas turbine engines, and in particular to liquid fuel control valves for turbine engines.

2. Description of the Related Art

Gas turbine engines have a set of rotating turbine blades that compress air leading to a combustion chamber into which fuel is injected and ignited. Fuel is delivered through metering orifices to burners in the combustion chamber under pressure through a fuel line. Combustion of the fuel turns a downstream set of blades from which energy is extracted and which can also be used to drive the compressor blades. Gas turbines used in power generation have large diameter blades and an array of combustion cans each with several burner nozzles that ignite the fuel at light-off and sustain combustion during operation. Many of these are dual fuel turbines (e.g., F-Class gas turbines) in which sustained operation can be achieved by burning either a liquid or a gaseous fuel. Diesel and heavy distillate fuel oils are common liquid fuels in power generation applications.

The combustion cans of the turbine are high pressure and temperature environments. It is typical for the environment surrounding the combustion cans to reach temperatures of 400° F., and for the combustion chamber temperature to near 2,000° F. The liquid fuel is consumed at a rate of about 20 gallons per minute at a high fuel pressure of about 1200 psig. This extreme environment is very hard on the fuel control components of the turbine fuel system, particularly for dual fuel turbines in which the during sustained gaseous burn, the liquid fuel system remains inoperable for long periods of time. The primary concern is the formation of the coke, or the tarry deposits left after the distillate or volatile components of the fuel are driven off by heat, on the metering orifices and other working surfaces of the liquid fuel control components. Coke deposits arise primarily from the presence of residual fuel left in the fuel atomizer, burner nozzles, control valves, fuel manifolds and other components subjected to the high heat of combustion. Residual liquid fuel left in the liquid fuel control components during gaseous operation will begin to coke at temperatures of about 250-280° F. in the presence of oxygen, which are well under the combustion temperature.

To evacuate the residual fuel, the fuel valves, burner nozzles and other components are purged with purge air bled from the turbine compressors or from an independent source. While the purge air coming from the compressors is hot, it is cooler than the combustion chamber temperatures so that it also cools the burner nozzles. Thus, air purging is necessary to prevent the burner nozzles from being damaged as well as to ensure that the system orifices and valves are clear of such deposits which could inhibit proper conduit of the fuel when the engine is returned to fuel mode.

An effective three-way purge valve is disclosed in U.S. Pat. No. 6,050,081, assigned to the assignee of the present invention and hereby incorporated by reference as though fully set forth herein. That valve has a spool valve that shuttles between positions alternatively blocking the combustion can (s) from either the purge air line or the fuel line. The spool is biased to close off the fuel line and is urged to open the fuel line by a pilot air actuated piston. Thus, when fuel is to be closed off from the engine, the spool valve will return to its initial position thereby allowing the burner nozzles and the downstream side of the spool to be purged to reduce or eliminate coking in these areas.

Even with good air purging, coking can still be a problem. Not all of the components in the fuel system subjected to high temperatures, for example fuel check and cut-off valves, are often not able to be purged because they may be providing the barrier between the fuel and air streams. And, even those components that are air purged, some amount of residual liquid fuel may remain in the small internal chambers and passageways of the valves or other components of the fuel system. Moreover, since the air purge control valves may themselves be located at or near the combustion cans, they too are subject to the adverse affects of coking.

To further reduce the effects of coking, U.S. Pat. No. 6,729, 135 discloses a system and method of circulating the liquid fuel through a heat exchanger to cool the temperature of the liquid fuel distillate during operation of the turbine in gaseous fuel mode. Coking is thus reduced in larger part by keeping much of the liquid fuel distillate temperature below the coking threshold temperature. However, this system requires a heat exchanger and either a separate fuel recirculation pump or increased duty on the main fuel pump. Moreover, because the recirculation lines carry liquid fuel, these lines, along with any recirculation control components, present yet another location for coking to occur when the recirculation system is not operating. To avoid this, during liquid fuel operation some of the liquid fuel must be made to bypass the combustor to flow through the recirculation system. Intermittent operation of the recirculation system is also possible, but only to the extend that sufficiently cool fuel temperatures can be maintained.

SUMMARY OF THE INVENTION

The present invention provides liquid fuel valves for use in the extreme temperature and pressure conditions of land and air based gas turbine engine applications. The compact valve package is cooled by a dedicated liquid coolant circuit circulating relatively low temperature water past critical parts of the valve to provide more consistent operation and reduce coking.

Generally, the invention provides a water cooled liquid fuel valve. The valve has a housing defining a fuel flow path including a valve chamber, a fuel inlet port and a fuel outlet port. A movable valve member is disposed in the valve chamber such that in a closed position it disrupts flow of fuel from the inlet to the outlet port. A cooling water circuit allows for circulating water of lesser temperature than the liquid fuel along parts of the valve housing and/or the valve member.

Dedicated water supply and return ports are used to connect the valve to a water supply via suitable lines. Preferably, the water return and supply ports are tangential to the valve chamber so that a swirling motions is effected inside the valve which aids in distributing the coolant along the interior of the valve and thereby improves heat transfer.

Depending on the construction of the valve, the cooling water circuit can introduce the cooling water into the valve chamber so as to come in direct contact with the valve member. For example, the valve member can be a poppet type valve with an elongated guide member. In this case, the cooling water can circulate through the valve chamber to cool both the housing and the entire length of the guide member as well as the back side of the poppet, the front side of which comes into direct contact with the high temperature fuel. The cooling water is preferably at low pressure so as not to affect the movement of the valve member.

The cooling water circuit can be designed to follow a spiral or helical path about at least a portion of the valve chamber. This circuit configuration effects an annular distribution of the coolant to better effect heat transfer, and thus further the pre-swirl induced by the tangential water supply port. The helical circuit can be formed in an suitable manner. In one preferred form, it is formed between the valve body housing the movable valve member and a water jacket. The water jacket has the water supply and return ports. It surrounds much or all of the valve body and is made to seal off the water circuit from the exterior. For example, a pair of high temperature seals can be used at each side of the water circuit which seat against the outer periphery of the valve body and the interior of the water jacket. Preferably, this is a slidable seal to permit the water jacket to translate or rotate relative to the valve body for slight position adjustment. The helical path itself can be formed by a continuous spiral groove at the outer periphery of the valve body or the interior of the water jacket. The groove, of course, is in communication with the water supply and return ports, preferably with one end of the groove at the supply port and the other end at the return port.

With the present invention, better performing valves of various constructions can be used in the extreme environment of a combustion area of a gas turbine engine to accomplish various objectives. For example, the valve can be a check valve used to prevent the back flow of liquid fuel from the burner nozzles, the valve can be a distributor valve for selectively and variably sending liquid fuel to the array of burner nozzles in the combustor cans of the turbine engine. The valve can be a purge valve, such as a three-way purge valve, that alternatively meters liquid fuel to the burner nozzles during liquid fuel operation of the gas turbine or purge air for the purpose of preventing coking and other evacuating liquid fuel from the burner nozzles during gaseous fuel operation or shut-down. Still further, the valve can be a combination purge air and distributor valve, providing these functions in a single unit.

Thus, in one aspect the present invention provides a water cooled liquid fuel check valve. The check valve can have a water jacket, having tangential water supply and return ports, that fits over a valve body having a spring biased fuel actuated valve member biased to close off communication between the fuel inlet and outlet ports. The valve body has an annular groove forming the cooling water circuit between the valve body and the water jacket in communication with the water supply and return ports. The valve can also have a special baffle member with a series of openings, some of which are axially aligned with the poppet valve member allowing liquid fuel to flow into a primary metering chamber. The baffle member also has radial openings to a stem with an axial passageway leading a portion of the fuel to a Helmhotz type resonance chamber, which preferably is defined by the interior of the poppet, to dampen pressure oscillations in the exiting fuel flow.

In another aspect, the present invention is a water cooled liquid fuel distributor valve regulating liquid fuel flow through one or more of a plurality of fuel outlets. The valve has a dedicated water cooling circuit with tangential supply and return ports, which in a preferred form can be in communication with the valve chamber to directly cool the moveable valve member. The distributor valve is designed to mount to and receive the output of a metering valve that controls shut off of the liquid full flow. The distributor valve is used to distribute the metered fuel to one or more of the array of burner nozzles in one or more combustion cans of the gas turbine. The distributor thus has a central fuel inlet port and a radial arrangement of fuel outlet ports, for example six fuel outlet ports arranged about fuel inlet port axis. The movable valve member opens and closes each of these primary fuel outlet ports for sustained liquid fuel operation of the gas turbine. However, each outlet port has parallel flow paths, the primary path being the large opening of the outlet port and the second path being a small flow orifice associated with each fuel outlet port. In this embodiment of the valve, these flow orifices are always in communication with the fuel inlet port even when the valve member closes off the primary flow path through the fuel outlet ports. The flow orifices are used to control the flow volume and rate at engine light-off, which typically requires less liquid fuel than during sustained combustion. The flow orifices can receive small modules that either define a plug or a flow passage of a diameter selected to achieve the necessary flow rate and volume. If a flow orifice is plugged by a module the associated burner nozzle will not receive fuel. Thus, this arrangement provides for selective flow rate/volume and the ability to send fuel to none or a selected one or subset of the burner nozzles.

In yet another aspect, the present invention provides a liquid fuel metering valve with a dedicated fluid coolant circuit and purge air and/or distributor sections. The valve includes three isolated flow circuits, namely a liquid fuel circuit, a cooling fluid circuit and a purge air circuit. In particular, the liquid fuel circuit includes a fuel inlet port, a fuel only section of the valve chamber and an outlet port. The purge air circuit includes an air inlet port, an air only section of the valve chamber and the outlet port. The cooling fluid circuit includes cooling fluid supply and return ports for circulating cooling fluid of proximate the valve member. The coolant circuit is preferably entirely separate passageways, for example having a spiral or helical section between the valve body and a water jacket. However in a preferred 3-way metering/purge valve construction, the fuel and purge air circuits, preferably share one or more passageways and the outlet port leading to the combustor(s) while the valve member isolates the air flow form the fuel flow so that these streams do not mix. The valve thus can be operated to meter fuel to the burner nozzle during sustained liquid fuel operation and alternatively to purge the downstream fuel lines and burners with air to cool them and extricate residual liquid fuel to prevent coking during shut down and gaseous fuel operation of the turbine.

In still another aspect, the valve is a fluid cooled combined purge air and distributor valve. In this case, the housing defines the aforementioned three flow circuits as well as a distributor section having a plurality of outlet ports which make up part of the liquid fuel circuit. Also, the liquid fuel circuit preferably includes a plurality of flow orifices disposed within the liquid fuel circuit between the fluid inlet port and an associated one of the plurality of outlet ports. At least one of the flow orifices receives a module that mounts to the valve housing. Each module can define a flow passageway or a plug blocking the flow of liquid fuel through the associated flow orifice. The valve is arranged so that the liquid fuel inlet port is in communication with the plurality of flow orifices when the valve member is in a first, lesser open position and in communication with the plurality of flow orifices and the plurality of outlet ports when the valve member is in a second, fully open position. This arrangement provides at least two benefits. First, it provides for a lesser volume of liquid fuel to flow to the turbine atomizer and burners, for example during light-off. Second, the modules allow the valve to be configured to flow liquid fuel to one or sub-set of burner nozzles designated to begin combustion at light-off.

These and still other advantages of the invention will be apparent from the detailed description and drawings. What follows are preferred embodiments of the present invention. To assess the full scope of the invention the claims should be looked to as the preferred embodiments are not intended as the only embodiments within the scope of the invention.

DETAILED DESCRIPTION OF THE PREFERRED EMBODIMENTS

The present invention provides a non-fuel liquid cooled liquid fuel valve for use in the extreme temperature and pressure environment of the fuel system of an air or ground gas turbine engine. The valve can take the form of a check valve, an air purge valve, a distributor valve, a combination air purge and distributor valve and the like. In any form, a movable valve member controls the flow of liquid fuel through the valve's fuel circuit and a separate cooling circuit circulates coolant through the valve near or alongside the valve member. Although not shown, for each embodiment of the valve suitable lines or conduit couple the valve to a water supply, which can be continuous cool water supply or a recirculated supply tank with or without external cooling. The coolant is any suitable non-fuel fluid, preferably water and preferably of a lower temperature than the liquid fuel. For simplicity, the following valve embodiments will be described as being water cooled.

FIGS. 1-5 illustrate a preferred embodiment of a water cooled, fuel actuated liquid fuel check valve 20. The check valve 20 has a valve housing formed of a hollow, open-ended water jacket sleeve 22 having water supply 24 and return 26 ports extending tangentially with respect to its interior where a valve body 28 is housed. Two seals 30 seal the interface between the jacket 22 and the valve body 28 and a snap ring 32 retains their assembly. The valve body 28 defines a spiral or helical groove 34, similar to a single start ACME thread pattern, at its outer peripheral surface. The flat peaks of the peripheral surface abut the inner bore of the jacket 22 so that the coolant follows the spiral circuit formed by the groove 34. One end of the groove 34 is located at the supply port 24 while the other end is at the return port 26. This arrangement very effectively distributes the coolant over the length of the valve body 28, and particularly about the working parts of the check valve. The tangential supply and return ports set up a swirl-like flow path which is carried through the spiraling groove 34 providing good distribution of the coolant for high heat transfer. Although not shown in the drawings, the coolant is supplied to the check valve by separate conduit coupled to a supply source, for example a water tank or building water supply and drain. A low pressure water pump (also not shown) in line with the conduit circulates the coolant through the check valve at a suitable rate to effect sufficient heat transfer to maintain residual fuel in the valve body below the coking threshold temperature, which is approximately 250-280° F.

Figure 1:
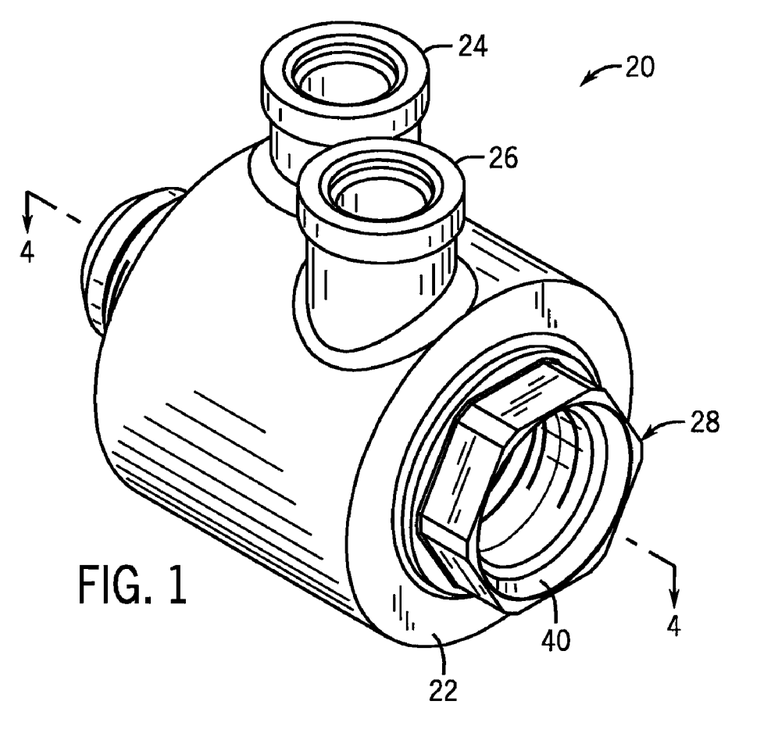
FIG. 1 is a rear perspective view of a water cooled liquid fuel valve in the form of a check valve according to the present invention.
Figure 2:
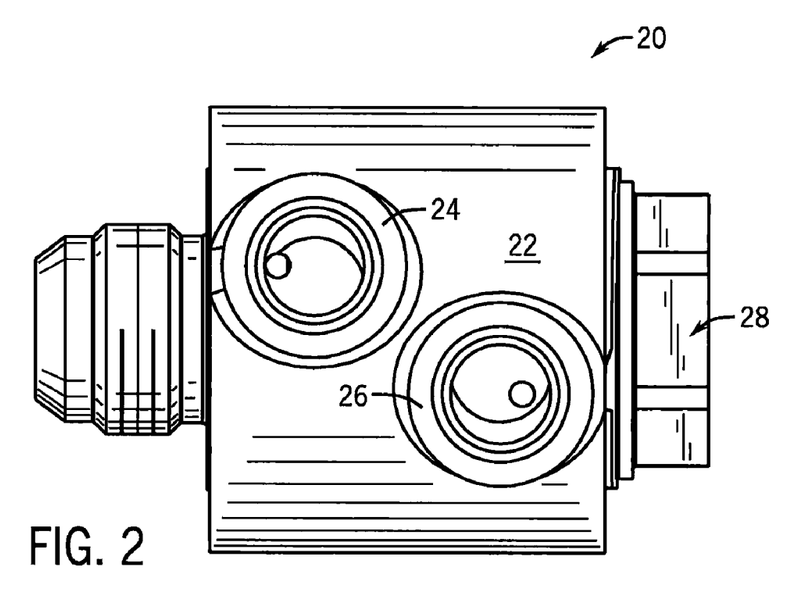
FIG. 2 is a top plan view thereof.
Figure 3:
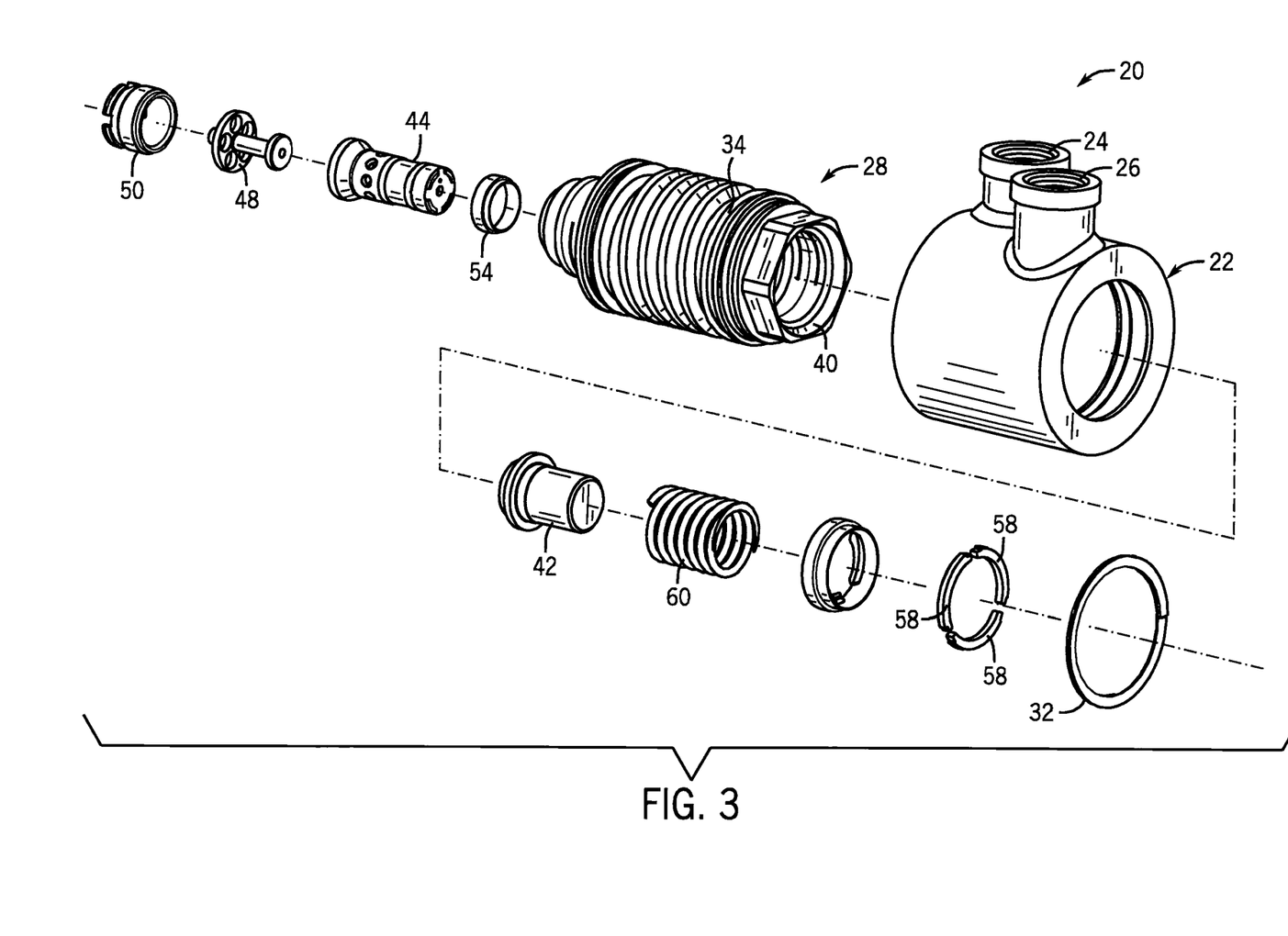
FIG. 3 is an exploded assembly view thereof.
Figure 4:
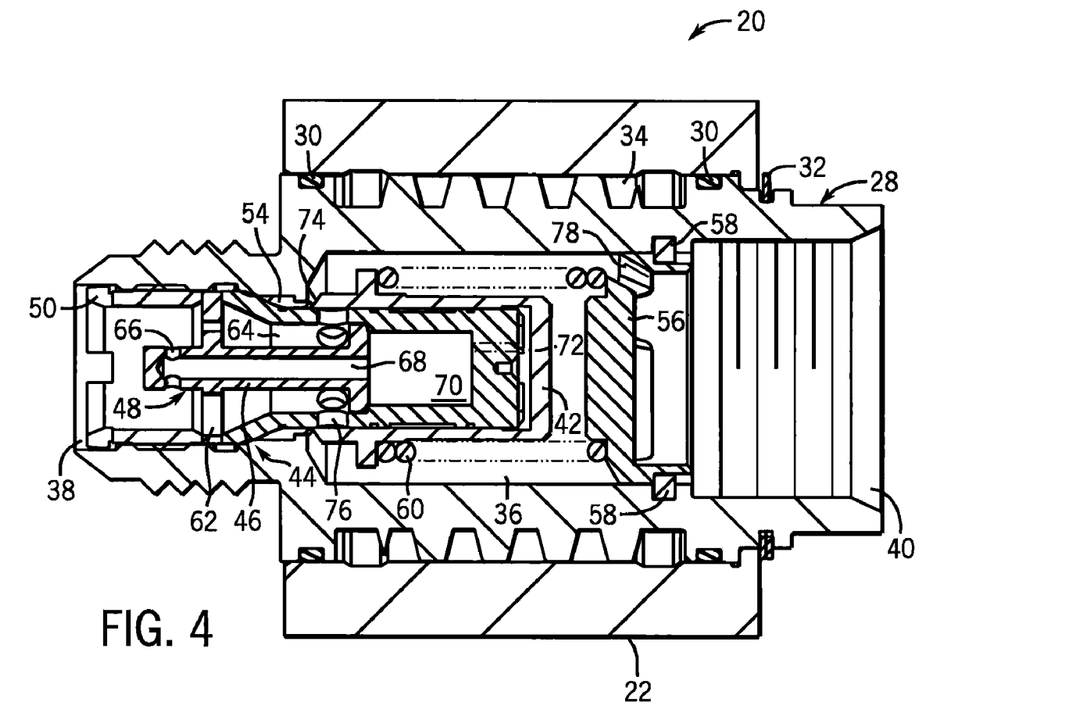
FIG. 4 is a cross-sectional view taken along line 4-4 of FIG. 1, showing the valve in closed position.
Figure 5:
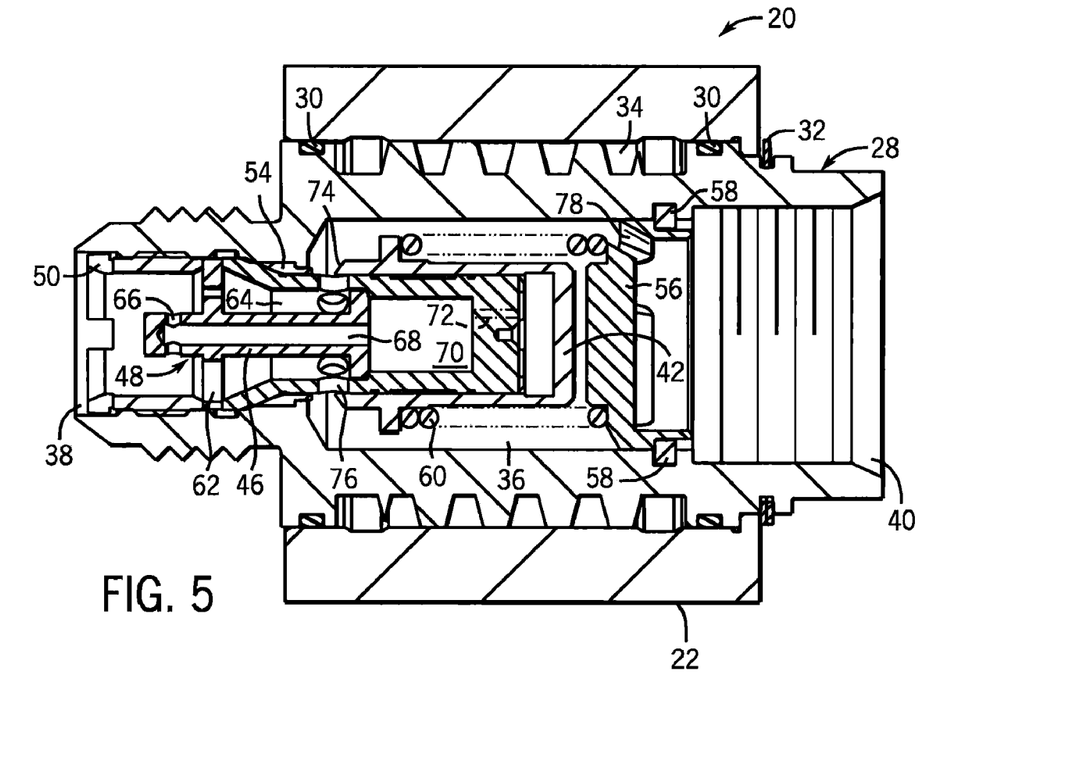
FIG. 5 is a similar sectional view showing the valve in an open position.

FIGS. 3-5 show the working components of the check valve 20. The valve body 28 defines a valve chamber 36 between fuel inlet 38 and outlet 40 ports protruding from opposite ends of the jacket 22. Within the valve body 28 is a cupped-shaped poppet 42 that slides axially about a generally cylindrical guide 44. The guide 44 has an open flared end in which a stem 46 of a baffle 48 fits. The baffle 48 is pressed against the guide 44 and both are held fixed within the valve chamber 36 by a retainer 50. A high temperature seal 54 fits around the guide to seal the inlet side of the valve chamber. The other side of the valve chamber is enclosed by another retainer 56, which is held in place by three keepers 58 engaging corresponding slots in the retainer 56 and the valve body. The poppet 42 is biased to the closed position shown in FIG. 4 by a return spring 60 extending between the retainer 56 and a flange of the poppet 42.

The liquid fuel flow circuit of the check valve passes between the fuel inlet 38 and outlet 40 ports, the valve chamber 36 as well as the baffle 48, guide 44 and retainer 56. In particular, the baffle 48 has a circular portion with a series of axial openings 62 allowing the liquid fuel to flow into a primary metering chamber 64 within the guide 44. The baffle 48 also has radial openings 66 that open to an elongated passageway 68 in the baffle stem 46 which leads to a Helmholtz resonance chamber 70, which acts as an accumulator to reduce pressure oscillations in the fuel. The end of the guide 44 has a small axial orifice 72 through which the liquid fuel flows to pressurize and drive the poppet 42 against the return spring 60 to move the tapered circular metering edge 74 to open radial metering orifices 76 in the guide 44. Liquid fuel then flows into the valve chamber and through orifices 78 in the retainer 56 and then out the fuel outlet 40.

Figure 6:
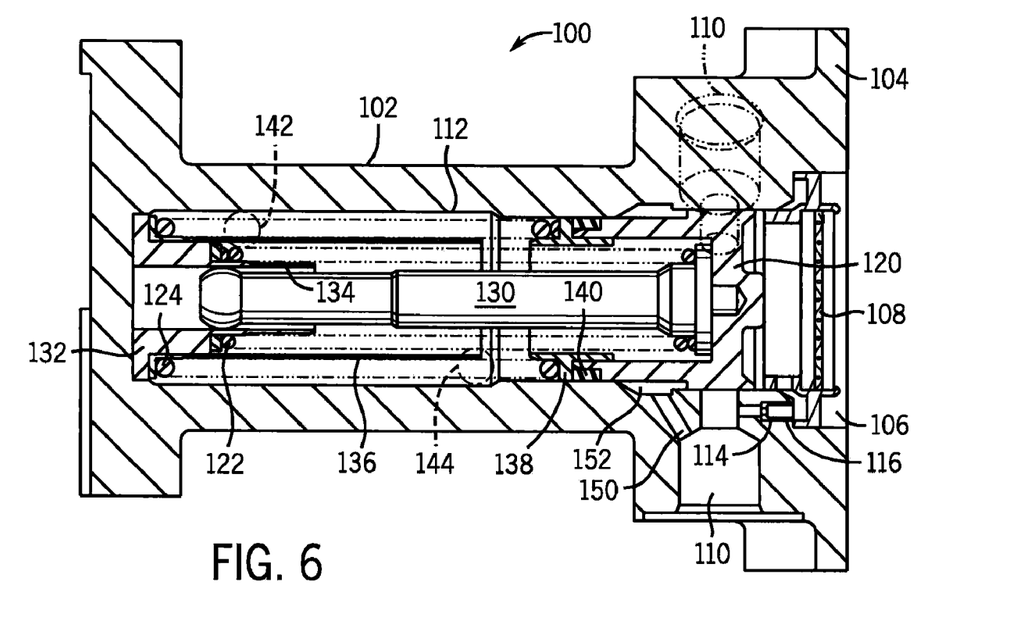
FIG. 6 is a sectional view of an embodiment of a water cooled liquid fuel valve in the form of a distributor for a gas turbine engine.
Figure 7:
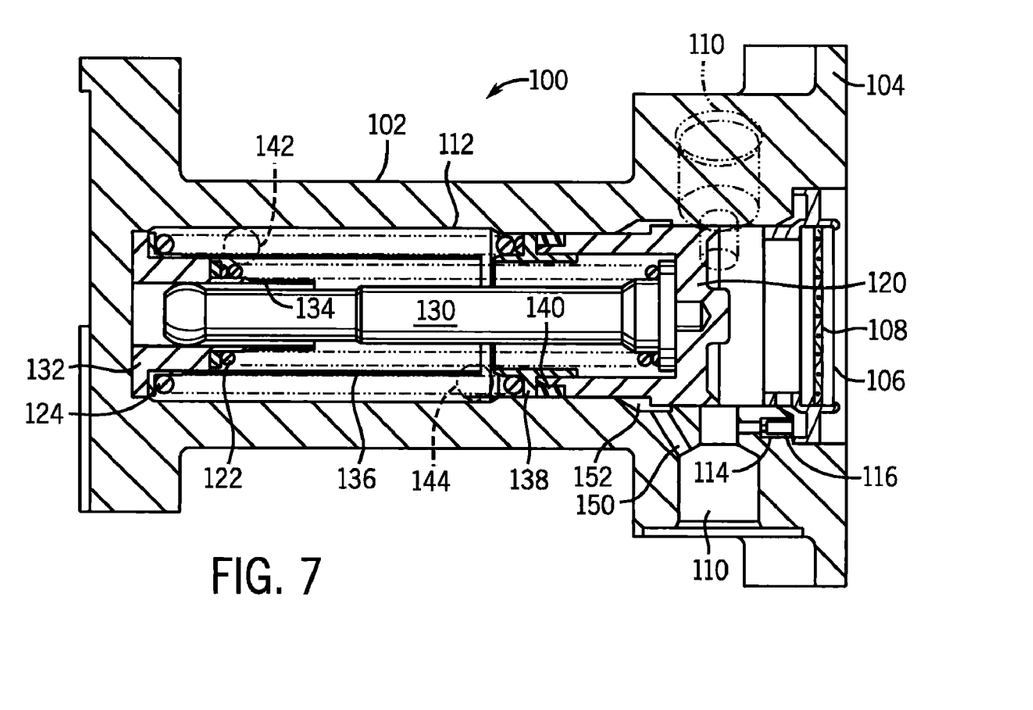
FIG. 7 is a similar sectional view showing the valve of FIG. 6 in an open position.

FIGS. 6 and 7 illustrate a water cooled liquid fuel actuated distributor embodiment of the valve 100. This distributor valve 100 has a valve housing 102 with a flanged end 104 that is designed to bolt onto another component of the liquid fuel system of the turbine, for example a liquid fuel metering valve (not shown) that controls liquid fuel flow to the distributor valve 100. The flanged end 104 of the housing 102 has a central axial fuel inlet port 106 with an inlet filter or screen 108 and an array of angularly spaced apart fuel outlet ports 110. There should be one outlet port for each combustion can of the turbine, which typically number 5 or 6, however, only two are shown (one being in phantom lines). The fuel inlet port 106 communicates with the plurality of fuel outlet ports 110 through a valve chamber 112 as well as through a plurality of small flow orifices 114 (and associated passageways), one orifice being associated with each of fuel outlet port. A small module 116 threads or presses into each orifice 114 so that the valve can be designed according to the intended application. Specifically, the module can be a small cup with a small through passageway so that the associated fuel outlet port is always in communication with the fuel inlet via that flow orifice, or it can be a plug with no passageway which blocks that flow orifice. Thus, depending on the module used in a particular orifice, either no liquid fuel or a small volume of liquid fuel can be sent to the associated combustor can nozzle during light-off of the turbine. The quantity and designated ones of the combustor can nozzles receiving liquid fuel at light-off can be selected simply by selecting the appropriate module. Further, the volume and flow rate of the light-off fuel can be selected by using modules with larger or smaller passageways.

As mentioned, the distributor valve 100 is to be used with a separate liquid fuel metering valve which can provide fuel shut-off to prevent any liquid fuel from passing through to the combustor cans. When liquid fuel is supplied to the distributor fuel inlet port 106, it will flow under pressure through one or more flow orifices 114 (depending on the configuration of the associated modules 116) and through the associated fuel outlet port(s) 110 to the turbine combustor can(s). It will do this (for engine light-off) regardless of the position of a poppet 120, that is when the poppet 120 is in either the closed position shown in FIG. 6 or the open position shown in FIG. 7. As the pressure of the liquid fuel builds, it will act on the face of the poppet 120 and drive it back against inner 122 and outer 124 return springs so that liquid fuel can flow through the valve chamber 112 and through the larger passageways 126 leading to the fuel outlet ports 110. An elongated guide 130 connects to the poppet 120 and extends back through the center of the return springs. A stationary retainer 132 backs up inner 134 and outer 136 sleeves having flanges against which the back ends of the respective inner and outer return springs press. The forward end of the inner return spring presses against a flange of the guide 130 while the outer return spring presses against a flange of a sliding retainer 138 which is pressed by the spring in abutment with the poppet 120. The periphery of the poppet 120 is sealed by a high temperature seal 140, for example, made of a graphite filled Teflon. It should be noted that the outer spring (and sliding retainer) could be eliminated if sufficient cooling can be achieved to allow use of a different seal construction, either fixed or sliding, which could be assembled and secured without use of the retainer.

The valve housing defines a water cooling circuit which begins and ends at water supply 142 and return 144 ports (shown in phantom), which again are tangential to the valve chamber to induce a swirling flow into the valve chamber. The coolant flows within the valve chamber and alongside the interior components of the valve behind the front face of the poppet 120. The seal 140 thus keeps liquid fuel isolated from the coolant, which is at low pressure (about 10 psi) relative to the liquid fuel, which realizes pressures exceeding 1,000 psi during operation of the turbine. Good heat transfer is achieved by winding the coolant through the housing and interior of the valve chamber wherein the coolant directly contacts the length of the guide and much of the back side surface of the poppet. The coolant flows in close proximity to the seal as well. The cooling will thus prolong the life of the working components and provide for more consistent operation by reducing coke deposits on the metering surfaces of the distributor valve.

The distributor valve also has an interstitial vent 150 that connects a widened collection area 152 of the valve chamber behind the metering face of the poppet with one of the fuel outlet ports, preferably the lowermost outlet port to allow for gravity draining. This enlarged area is designed to collect any liquid fuel (which is at very high pressures) leaking past the metering face of the poppet and allow it to be drawn into the designated outlet port. After the turbine is switched to gaseous fuel mode and liquid fuel is no longer flowing through the distributor valve, residual liquid fuel in the valve chamber and in the collection area will drain to the outlet port. If the distributor valve is coupled to a purge valve, the pressurized purge air will purge the valve chamber and draw any residual fuel in the collection area out through the outlet port.

Figure 8:
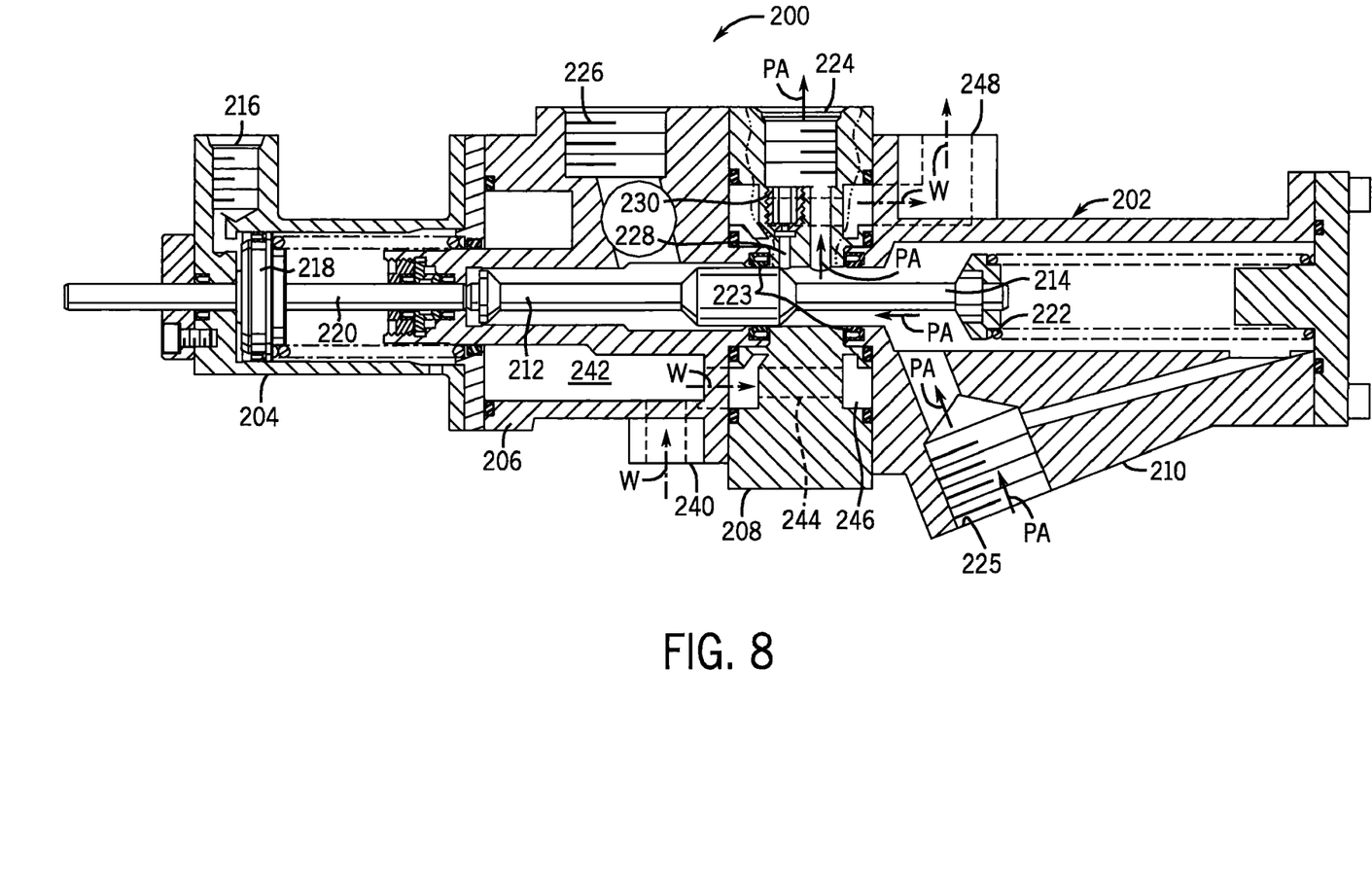
FIG. 8 is sectional view of another embodiment of a water cooled liquid fuel valve in the form of a combined air purge and distributor valve, the valve being shown with its valve member positioned for purge air flow.
Figure 9:
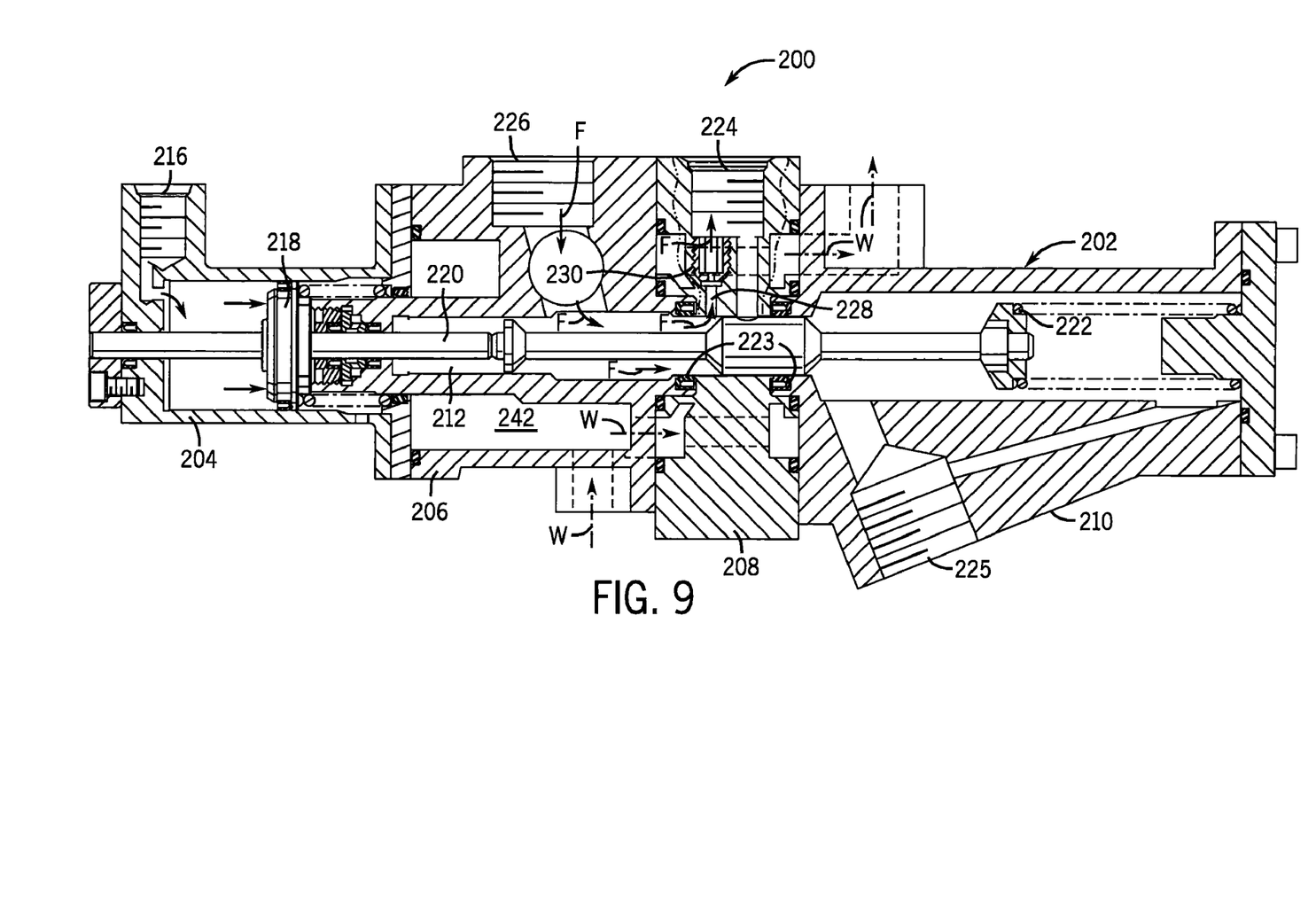
FIG. 9 is a similar sectional view showing the valve of FIG. 8 in a start-up position in which liquid fuel flows through one or more small flow orifices.
Figure 10:
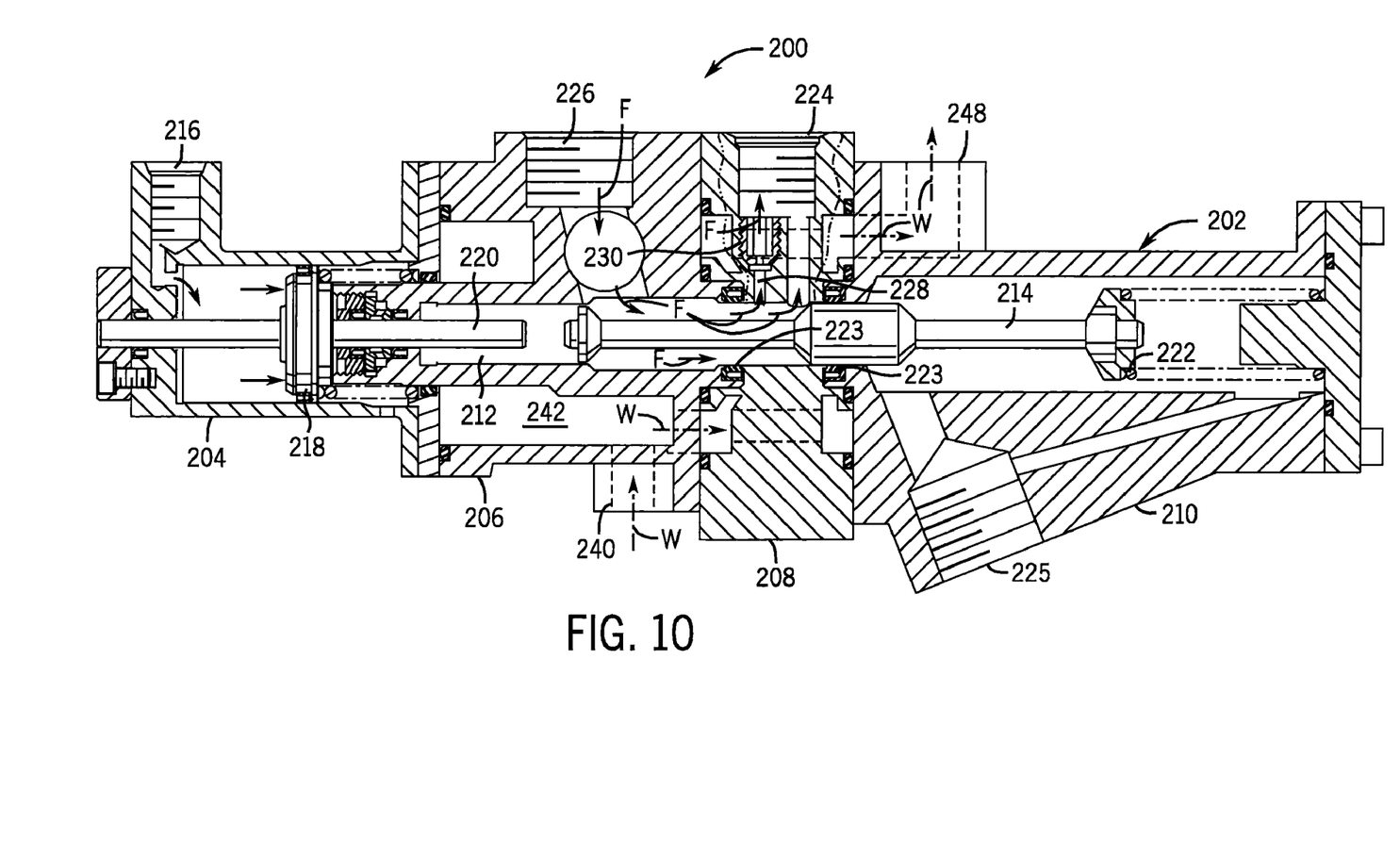
FIG. 10 is another sectional view showing the valve of FIG. 8 in a fully open position in which a plurality of fuel outlets are opened.

FIGS. 8-10 illustrate a water cooled combination purge and distributor valve. A non-cooled combination valve is shown and described in U.S. Pat. No. 6,931,831, which is assigned to the assignee of the present invention, the entire disclosure of which is hereby incorporated by reference as though fully set forth herein. That patent provides a very detailed description of a non-cooled combined purge air and distributor valve, albeit with fuel recirculation, for a dual fuel gas turbine and thus this description will address the construction and operation of the valve only briefly.

The combination valve 200 is a water cooled purge air and distributor valve. The valve housing 202 is formed of a pilot air section 204, a liquid fuel inlet section 206, a distributor section 208 and a purge air section 210. These sections are connected together to define an elongated valve chamber 212 in which a spool valve 214 with two tapered metering ends is disposed. The spool valve 214 can be driven actively by pilot air flowing through pilot air inlet port 216 and acting against spring biased piston 218 which has a rod 220 that can abut one end of the spool valve 214 to move it against its return spring 222. The enlarged spool body slidably seals against one or both of two high temperature annular seals 223 to isolate the purge air from the liquid fuel during any position of the spool valve.

The spool valve 214 and piston rod 220 are in abutment in a liquid fuel shut-off position shown in FIG. 8, in which the air can flow through a purge air circuit through purge air inlet port 225, the valve chamber and out the several (preferably six) outlet ports 224 to purge the combustor cans (not shown). The arrows labeled "PA" illustrate the purge air circuit flow path.

The forces of the pilot air and/or the liquid fuel move the spool valve to a burner light-off position shown in FIG. 9 in which the purge air inlet port is no longer in communication with the outlet ports and a liquid fuel inlet port 226 is in communication with one or more of the outlet ports 224 through one or one or more of the several (again preferably six) small flow orifices 228 in which modules 230 are disposed. Note that the outlet ports, flow orifices and modules are generally the same and provide the same staged fuel flow benefits as described above with the dedicated water cooled distributor valve, albeit the spool valve opens and closes the flow orifices relative to the fuel inlet (rather than having them always open to the fuel inlet as in the aforementioned distributor valve). The arrows labeled "F" in FIG. 9 illustrate the liquid fuel circuit as it is during light-off.

With continued liquid fuel flow the spool valve is further opened passively by fuel pressure alone to the sustained combustion position shown in FIG. 10 in which the liquid fuel inlet port is in full communication with all of the outlet ports. The arrows labeled "F" in FIG. 10 illustrate the path of the liquid fuel circuit during sustained liquid fuel operation of the turbine.

The liquid fuel inlet 206, distributor 208 and purge air 210 sections of the valve housing also form the water cooling circuit of the valve 200, which is designated by the arrows labeled "W" in the FIGS. 8-10. Specifically, the coolant flows through from water supply port 240 into an annular cavity 242 in the liquid fuel inlet section 206 of the housing. Coolant then flows through six axial passages 244 (two shown in phantom) and another annular cavity 246 in the purge air section where it exits through water return port 248. As before, the water supply and return ports are tangentially disposed to induce a rotational flow inside the valve. The combining valve provides adequate cooling of the valve chamber and working components, particularly the spool valve and its seals which come into direct contact with the high pressure and temperature liquid fuel, so as to reduce or eliminate the formation of coke deposits in critical areas of the valve, thereby providing a more reliable valve for use in the extreme gas turbine environment.

Although not shown, the valve could also take the form of a water cooled 3-way purge valve, which is generally similar to the aforesaid combining valve without the distributor section. A non-cooled 3-way purge valve is disclosed in U.S. Pat. No. 6,050,081, which is assigned to the assignee of the present invention, and the entire disclosure of which is hereby incorporated by reference as through fully set forth herein, especially FIGS. 1-3 and the description at col. 2, line 55 to col. 4, line 35.

The present invention would thus include a liquid fuel circuit and a purge air circuit controlled by a valve actuated by pilot air (active) or liquid fuel (passive). Preferably, the valve is a dual acting spool valve designed to isolate and alternatively meter the liquid fuel and the purge air. The valve would further include a water cooling circuit running through the valve housing with tangential supply and return ports. The cooling circuit could be formed by a jacket surrounding the valve body or it could be integral with the valve body. Preferably, the cooling circuit would extend about the valve chamber, for example in a spiral path, in close proximity to the valve member and seals.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A combination distributor purge valve unit for a turbine engine, comprising:
    a fuel section having a fuel inlet;
    a purge air section having an air inlet;
    a distributor section disposed between the fuel section and the purge air section and having a plurality of outlets;
    a spool movable along a spool axis from a first position in which the plurality of outlets are in communication with the air inlet and closed off from the fuel inlet to a second position in which the plurality of outlets are in communication with the fuel inlet and closed off from the air inlet; and
    a water cooling circuit in communication with a coolant supply port and a coolant return port defined at the exterior of the valve, the water cooling circuit having passageways within at least one of the fuel, purge air, and distributor sections and in contact with an internal component of the valve within an interior defined by the at least one fuel, purge air and distributor sections for carrying coolant that is isolated from the fuel and the purge air to receive and carry away heat from the internal component.

2. The valve of claim 1, wherein the water cooling circuit effects rotational flow relative to the valve axis.

3. The valve of claim 2, wherein the coolant supply and return ports are tangentially disposed on the valve housing with respect to the spool axis.

4. The valve of claim 1, wherein the water cooling circuit passageways include multiple axial passageways that are defined by the distributor section.

5. The valve of claim 4, wherein the water cooling circuit further includes an annular cavity in the fuel section and an annular cavity in the purge air section, such that each annular cavity communicates with each axial passageway.

6. The valve of claim 1, wherein each of the plurality of outlets includes first and second passageways, the first and second passageways being in communication with the air inlet when the spool is in the first position and in communication with the fuel inlet when the spool is in the second position.

7. The valve of claim 6, wherein the first passageways are fill nozzles and the second passageways are outlet orifices of greater bore diameter than the fill nozzles.

8. The valve of claim 1, wherein the spool moves along the spool axis within a spool chamber extending within the fuel distributor and purge air sections and wherein the plurality of outlets are disposed about the spool axis so that the outlets extend radially from the spool chamber.

9. The valve of claim 8, wherein the distributor section has six such outlets spaced equiangularly about the spool axis.

10. The valve of claim 1, wherein a first annular seal is disposed between the plurality of outlets and the fuel inlet and a second annular seal is disposed between the plurality of outlets and the air inlet.

11. The valve of claim 10, wherein the spool includes a valve section sized to mate with the first and second annular seals.

12. The valve of claim 1, further including a pilot air section adjacent the fuel section and containing an actuator piston disposed along the spool axis operable by pilot air to move the spool away from the first position.

13. The valve of claim 1, wherein the fuel section further includes a recirculation port in communication with the fuel inlet and an upstream side of a valve section of the spool through at least one internal passageway.

14. The valve of claim 1, wherein the distributor section includes a mounting bore extending parallel to the spool axis.

15. The valve of claim 1, wherein the fuel section includes a venturi passageway at the fuel inlet and a particle trap opposite the venturi passageway.

16. A combination distributor purge valve unit for a turbine engine with a valve housing, comprising:
    a fuel section of the valve housing having a fuel inlet;
    a purge air section of the valve housing having an air inlet;

a distributor section disposed between the fuel section and the purge air section of the valve housing and having a plurality of outlets;

a spool internal to the valve housing that is movable along a spool axis from a first position in which the plurality of outlets are in communication with the air inlet and closed off from the fuel inlet to a second position in which the plurality of outlets are in communication with the fuel inlet and closed off from the air inlet; and a water cooling circuit internal to the valve housing in communication with a coolant supply port and a coolant return port, wherein the water of the cooling circuit has rotational flow relative to the valve axis and receives and carries heat away from the valve.

17. The valve of claim 16, wherein the coolant supply and return ports are tangentially disposed to the valve housing.

18. A combination distributor purge valve for a turbine engine, comprising:
   a fuel section having a fuel inlet;
   a purge air section having an air inlet;
   a distributor section disposed between the fuel section and the purge air section which includes six outlets spaced equiangularly in a radial fashion about the valve;
   a spool movable along a spool axis for altering whether isolated fuel or isolated purged air communicates with the six outlets; and
   a water cooling circuit internal to the valve in communication with a coolant supply port and a coolant return port for receiving and carrying heat away from the valve, the water cooling circuit having six axial passageways located in the distributor section, wherein the axial passageways are spaced equiangularly in a radial fashion about the spool axis such that only one axial passageway is located between two adjacent outlets and each axial passageway is isolated from the outlets.

19. The valve of claim 18, wherein the water cooling circuit further includes an annular cavity in the fuel section and an annular cavity in the purge air section, such that the axial passageways communicate with both annular cavities.

20. The valve of claim 19, wherein the coolant supply and return ports are tangentially disposed to the valve such that the coolant has rotational flow in the water cooling circuit.

* * * * *